May 10, 1966  D. CERCONE  3,250,001
SHEARS
Filed Dec. 13, 1963

INVENTOR.
DANIEL CERCONE
BY
ATTORNEYS

United States Patent Office 3,250,001
Patented May 10, 1966

3,250,001
SHEARS
Daniel Cercone, 4720 Liberty Ave., Pittsburgh, Pa.
Filed Dec. 13, 1963, Ser. No. 330,494
6 Claims. (Cl. 30—195)

My invention relates to shears and more particularly to a type of barber shears for producing a particularly artistic effect on hair.

In accordance with the prior art of which I am aware, barber shears have been constructed for producing a thinning effect which comprise two cooperating blades, one of which blades comprises a large number of parallel cutting teeth separated by small distances therebetween. The other blade of said blades is oriented so that when it is slid against the sides of the teeth of the toothed blade, there is produced a cutting or shearing action at the point of the teeth of the toothed blade. The second blade has been constructed with a straight line edge or a smooth curved edge so as to produce particular artistic effects. It has always been assumed that the points of the teeth on the toothed blade should lie in a straight line and that any change in orientation from the straight line configuration would have substantially no beneficial effects in addition to substantially increasing the cost of construction. It has generally been assumed that the number of hairs falling into any of the interstices between the teeth would be entirely a function of the location of the hairs and would not be a function of the relative length of the teeth or alignment of the points of the teeth. However, in accordance with my invention, I have concluded that this premise is not correct and that a substantial difference in effect could be accomplished by providing variations in the length of relative orientation of the ends of the teeth.

It is therefore an object of my invention to produce improved barber shears.

It is another object of my invention to provide improved barber shears wherein the shears comprise one blade of a relatively straight or slightly arcuate surface whereas the other blade comprises a large number of teeth arranged so that the tips of the teeth lie in an irregular or arcuate manner.

It is still another object of my invention to provide thinning shears for artistic hair styling wherein the thinning teeth are so arranged that their cutting extremities lie in an irregular or arcuate relationship with respect to each other.

It is still another object of my invention to provide a novel and useful article of manufacture.

In accordance with my invention I provide barber shears for artistic treating of hair comprising a smooth blade and a toothed blade arranged to cooperate with each other so as to produce a thinning and shearing action. The toothed blade comprises a large number of closely spaced projections or teeth in parallel alignment. The ends of the teeth which perform the cutting action are arranged, not in a straight line, as in the prior art, but instead are oriented so that their cutting points lie in an arcuate or irregular line. The cutting tips of the teeth may be either formed substantially rectangularly or they may be formed with a V-shaped groove at the tip thereof. If the teeth are formed in a rectangular manner, and particularly if they are formed in a slightly sloped or distorted rectangular tip, the individual hairs will tend to slide along the edges of the teeth areas. If the teeth are formed with a V-shaped groove in the end thereof, individual hairs will be held in place during the cutting process so that the relative orientation of the individual hairs tends to be retained in its predetermined relative positions.

With the points of the teeth arranged in an irregular manner there will be a tendency for large groups of hairs to be partially displaced during the closing of the shears due to the pressure between the two blades. This has the effect of producing an irregular and artistic hairdressing effect which is difficult to attain with the standard shears presently employed. It will be noted that this displacement is amplified if the grooves on the ends of the teeth are omitted and instead the ends of the teeth are shaped in such a manner that their edges form substantially a line congruent with the general alignment of the teeth points at that region. Thus in a region where the teeth are successively becoming shorter and the ends of the teeth are sloped toward the regions where the teeth are shortest, the individual hairs will be caused to be displaced, during the closing process of the two blades but immediately prior to the actual shearing of the hairs, so as to change the relative positioning of the hairs before the actual shearing takes place.

The points of the teeth may, in accordance with one embodiment of my invention, be slightly indented to prevent the individual hairs from sliding completely off of the points of the teeth thus avoiding all shearing action and in this embodiment it may be found desirable to have a slight V-shaped groove at the point of the teeth, but preferably, this V-shaped groove should not be large enough to entrap more than two or three hairs because if the V-shaped groove is sufficiently large it may entrap all of the individual hairs in that particular region thereby preventing any lateral displacement of the individual hairs which might otherwise be caused by the irregular configuration or alignment of the ends of the teeth. In shears designed in this manner, the V-shaped grooves should be arranged or constructed so that the two edges of the V-shaped grooves are not co-extensive but instead constructed so that the line between the two edges or points of the V-shaped groove lie along the general line of orientation of the teeth tips in that region. Thus surplus hairs engaging one of the teeth with a V-shaped groove will tend to slip off in the desired and predetermined direction so that the desired redistribution of individual hair fibers is obtained immediately prior to the time of actual shearing of the individual fibers.

While I have described a summary of my invention, the invention itself will best be determined by reference to the following description in connection with the appended drawings in which.

In accordance with my invention, I provide barber shears comprising two rigid pieces of metal joined near their center so as to rotate around a common axis. One of these pieces comprises a substantially straight cutting blade 4 and the other piece comprises a thinning blade 6 having a plurality of closely separated teeth 8 extending along its length so as to cooperate with the cutting edge of the first blade 4 in order to cut strands of hair lying between the points of the teeth on the thinning blade 6 and the smooth cutting edge on the smooth blade 4.

The two blades are hinged and joined so as to cooperate in the manner well known in the art to produce a cutting action.

Figure 1:
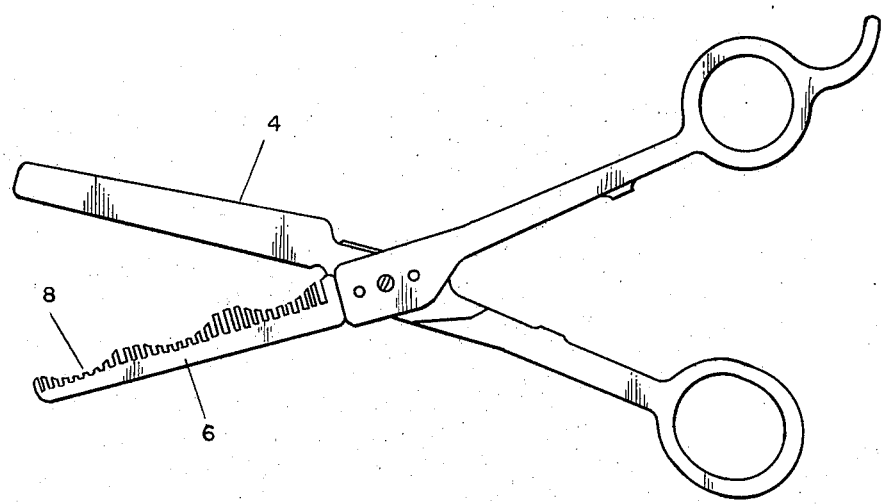
FIGURE 1 is a showing of shears in accordance with a preferred embodiment of my invention in which the teeth are formed in a plurality of arcuate curves.
Figure 2:
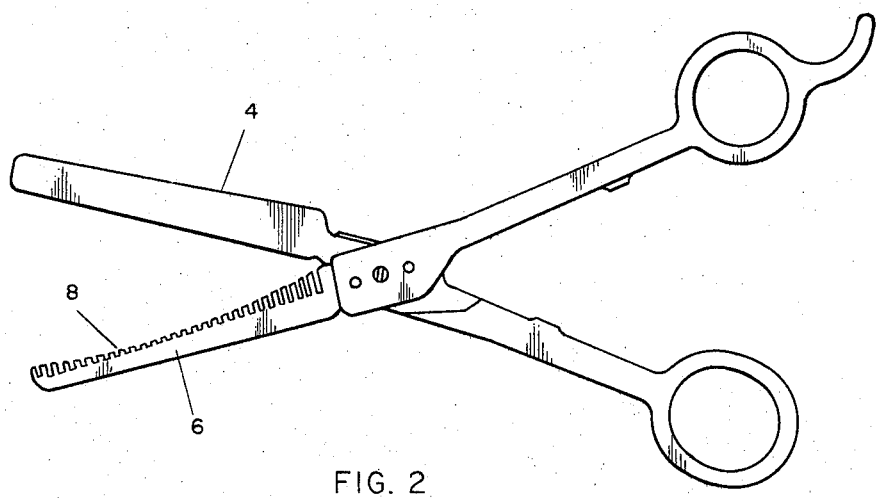
FIGURE 2 is a showing of shears in accordance with a preferred embodiment of my invention wherein the tips of the teeth are aligned in a single concave curve along the length of the cutting blade.

The toothed blade comprises a large number of teeth spaced apart and extending generally in a direction toward the straight blade. The ends of the teeth of the toothed blade are arranged in an irregular manner preferably in an arcuate manner so that the lengths of the teeth vary and so that the ends of the teeth instead of being aligned along a straight line present an irregular orientation to the straight smooth blade. The relationship of the ends of the teeth may be that of a single long curve as shown in FIGURE 2 or in accordance with another embodiment of my invention they may be arranged in a plurality of curves as shown in FIGURE 1 depending upon the effect desired. Thus the spacing between the straight blade and the teeth of the toothed blade will vary along the length of the toothed blade in a manner different from the variation in the spacing of their axes. As the shears are closed, moving the two blades toward each other, bunches of hair near the juncture of the two blades will tend to be spread out and displaced out from the axis between the two blades and toward the bottom of the first undulation of the teeth, while bunches of hair at the bottom of the first undulation will have a tendency not to rise up or slope out from the common axis of the two blades. Thus a bunch of hair near the axis between the two blades will be displaced toward the bottom part of the undulation or lower curvature of the teeth points so that a maximum number of individual strands of hair will be cut in the lower portion of the curve of the teeth points while a minimum number of hair strands will be in the region near the axis between the two blades. It will be noted that the maximum cutting will not occur at the bottom of the curve but instead the maximum cutting will tend to occur on the ascending slope just beyond the bottom of the curve away from the axis between the two blades.

The points of the teeth may comprise or be shaped in the manner of straight lines or they may be grooved in substantially a V-shaped cut. The purpose of the V-shaped cut in the prior art has been to preserve the orientation relation between the strands of hair so that a cutting action occurs at the points and the individual hairs are not allowed to slide off into the grooves between adjacent teeth which grooves or separations are sufficiently deep to hold a large number of strands of hair and prevent their being severed. However, in accordance with one embodiment of my invention, the surfaces of the teeth at their cutting edge are substantially in a straight line lying generally along the arcuate line of the group of teeth at that point in a smooth tangential manner. While this will allow strands of hair to slip off of the teeth more freely, nevertheless, sufficient number of srtands will be cut to have a substantial effect. It will also be noted that where a large bunch of hair is involved, and the action of the shears is relatively rapid, only a few of the individual hair strands will tend to fall into the gaps of the teeth but instead with a curved configuration of teeth alignment in accordance with my invention, the strands of hair will move along the general line of curvature of the points of the teeth until they reach a point where they are sufficiently few in number per unit length that they will be sheared by the occlusion of the shearing blades. Thus instead of producing merely a thinning action in a regular line, shears in accordance with my invention will produce a thinning action with a high degree of variety among the individual strands. This will tend to have two effects. First, the thinning action will be automatically dispersed as to the lengths of the adjoining hairs which are adjacent each other and secondly, the shears will produce a variable and artistic configuration over a relatively large region.

In the embodiment of my invention where the teeth are grooved at their points so that individual hairs tend to be trapped by individual teeth prior to the shearing action, the two points of each tooth preferably do not conform to a line perpendicular to the long dimension of the tooth but instead the two points lie along a line generally tangential to the line of curvature of the group of teeth in that regioin. Thus the surplus hair strands tend to be encouraged to be displaced off of the point of each tooth generally away from the axis between the two blades and toward or a little beyond the low point of curvature of the points of the teeth. In accordance with the embodiment of my invention wherein the V-shaped groove is provided at the tips of the teeth, the V-shaped groove should not be large enough to entrap more than two or three hairs but instead should be sufficiently shallow to entrap only a small number of hairs and cause the larger bulge of the hairs to be displaced laterally along the length of the blade.

In accordance with one embodiment of my invention, the shears may be constructed with interchangeable parts so that the toothed blades may be interchanged so as to provide various configurations with one particular set of shears.

I claim as my invention:

1. Barber shears comprising a first blade which is serrated to produce a thinning effect and having a plurality of teeth with substantially parallel sides and sharpened cutting ends; a second blade connected by a pivot to said first blade so as to cooperate with said first blade in a shearing action, said second blade having a cutting edge which is substantially a straight line, and said first blade having the points of the teeth curved in an arc the axis of which is substantially parallel to the axis of said pivot, with said teeth oriented to cooperate in a shearing action with the cutting edge of said second blade.

2. Barber shears as recited in claim 1 wherein the arc of said first blade forms a curved line in convex relation to the cutting edge of said second blade.

3. Barber shears as recited in claim 1 wherein the arc of said first blade forms a curved line in concave relation to the cutting edge of said second blade.

4. Barber shears comprising a first blade which is serrated to produce a thinning effect and having a plurality of teeth with substantially parallel sides and sharpened cutting ends; a second blade connected by a pivot to said first blade so as to cooperate with said first blade in a shearing action, said second blade having a cutting edge which is substantially a straight line; and said first blade having the points of the teeth curved to form a plurality of successive arcs along the length of said first blade, with the axes of said arcs substantially parallel to the axis of said pivot, with said teeth oriented to cooperate in a shearing action with the cutting edge of said second blade.

5. Barber shears as recited in claim 4 wherein said plurality of successive arcs is in convex relation to the cutting edge of said second blade.

6. Barber shears as recited in claim 4 wherein said plurality of successive arcs is in concave relation with said cutting edge of said second blade.

References Cited by the Examiner
UNITED STATES PATENTS

| | | | |
|---|---|---|---|
| 202,496 | 4/1878 | Wegmouth | 30—355 X |
| 1,962,264 | 6/1934 | Veit | 30—195 |
| 2,558,264 | 6/1951 | Metcalf | 30—195 |
| 2,758,371 | 8/1956 | Marchesani | 30—195 |

WILLIAM FELDMAN, *Primary Examiner.*

J. C. PETERS, *Assistant Examiner.*